(12) United States Patent
Ragazzi

(10) Patent No.: US 10,336,157 B2
(45) Date of Patent: Jul. 2, 2019

(54) METHOD AND SYSTEM FOR VEHICLE CLIMATE CONTROL

(71) Applicant: Ford Global Technologies, LLC, Dearborn, MI (US)

(72) Inventor: Franco Ragazzi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 15/659,263

(22) Filed: Jul. 25, 2017

(65) Prior Publication Data

US 2017/0320374 A1 Nov. 9, 2017

Related U.S. Application Data

(62) Division of application No. 14/163,828, filed on Jan. 24, 2014, now Pat. No. 9,751,381.

(51) Int. Cl.
| | |
|---|---|
| *B60H 1/00* | (2006.01) |
| *B60H 1/22* | (2006.01) |
| *B60H 1/32* | (2006.01) |

(52) U.S. Cl.
CPC ..... *B60H 1/00907* (2013.01); *B60H 1/00899* (2013.01); *B60H 1/22* (2013.01); *B60H 1/3207* (2013.01); *B60H 1/3213* (2013.01); *B60H 2001/00928* (2013.01); *B60H 2001/00935* (2013.01); *B60H 2001/00949* (2013.01); *B60H 2001/2228* (2013.01)

(58) Field of Classification Search
CPC ...... B60H 1/00907; B60H 2001/00928; B60H 2001/00935; B60H 2001/00949; B60H 2001/0092; B60H 83/024; B60H 1/43; B60H 1/04
See application file for complete search history.

(56) References Cited

U.S. PATENT DOCUMENTS

| | | | |
|---|---|---|---|
| 6,321,697 B1 | 11/2001 | Matsuda et al. | |
| 6,394,210 B2 | 5/2002 | Matsuda et al. | |
| 2009/0130513 A1* | 5/2009 | Tsuchiya | B60H 1/00385 429/412 |

(Continued)

FOREIGN PATENT DOCUMENTS

| | | |
|---|---|---|
| CN | 101348073 A | 1/2009 |
| CN | 101522447 A | 9/2009 |

(Continued)

OTHER PUBLICATIONS

State Intellectual Property Office of the People's Republic of China, Office Action and Search Report Issued in Application No. 201510037029.1, dated Mar. 14, 2018, 9 pages. (Submitted with Partial Translation).

(Continued)

*Primary Examiner* — Elizabeth J Martin
(74) *Attorney, Agent, or Firm* — David Kelley; McCoy Russell LLP

(57) ABSTRACT

Methods and system for operating a vehicle climate control system comprising a heat pump and one or more coolant loops are described. In one example, the heat pump sends fluid to high and low temperature coolant loops based on operating mode. The systems and methods may be incorporated into electric, hybrid, and internal combustion engine propelled vehicles.

18 Claims, 5 Drawing Sheets

(56) References Cited

U.S. PATENT DOCUMENTS

| | | | |
|---|---|---|---|
| 2009/0205353 A1 | 8/2009 | Takahashi | |
| 2012/0018127 A1 | 1/2012 | Iwasaki | |
| 2012/0227431 A1 | 9/2012 | Wang et al. | |
| 2013/0081419 A1 | 4/2013 | Katoh et al. | |
| 2013/0306302 A1 | 11/2013 | Osaka et al. | |
| 2014/0020415 A1* | 1/2014 | Heyl | F25B 13/00 62/119 |
| 2015/0052913 A1 | 2/2015 | Smith et al. | |
| 2015/0183296 A1 | 7/2015 | Ragazzi | |

FOREIGN PATENT DOCUMENTS

| | | |
|---|---|---|
| CN | 102679477 A | 9/2012 |
| KR | 101451808 B1 | 10/2014 |

OTHER PUBLICATIONS

Anonymous, "Intelligent Auxiliary Water Heater Pump Control for Automotive Applications," IPCOM No. 000138732, Published Jul. 31, 2006, 3 pages.

* cited by examiner

METHOD AND SYSTEM FOR VEHICLE CLIMATE CONTROL

CROSS REFERENCE TO RELATED APPLICATION

The present application is a divisional of U.S. patent application Ser. No. 14/163,828, entitled "METHOD AND SYSTEM FOR VEHICLE CLIMATE CONTROL," filed on Jan. 24, 2014. The entire contents of the above-referenced application are hereby incorporated by reference in its entirety for all purposes.

FIELD

The present description relates to methods and a system for improving heating and cooling of a vehicle's passenger compartment. The methods and system may be particularly useful for vehicles that are solely electrically propelled or vehicles that may include an engine that may be stopped during vehicle operation to improve the vehicle's fuel economy.

BACKGROUND AND SUMMARY

A passenger cabin of a vehicle may be heated and cooled via a heat pump. The heat pump may use a heat pump heat exchanger external to the passenger compartment as an evaporator in a passenger cabin heating mode. The heat pump may use the same heat pump heat exchanger as a condenser in a passenger compartment cooling mode. The heat pump heat exchanger is placed in an ambient air flow path to extract or reject heat to or from ambient air. However, the vehicle may also include other heat exchangers that use ambient air to reject heat from the vehicle. For example, if the vehicle includes an engine, the vehicle may include an engine radiator and a transmission cooler. The heat pump heat exchanger may be placed in the same air flow path as other vehicle heat exchangers due to vehicle packaging requirements. If the heat pump heat exchanger is placed in front of other vehicle heat exchangers, the heat pump heat exchanger may extract less heat from air flowing in the air flow path during a passenger cabin heating mode than is desired since the heat pump heat exchanger is exposed only to ambient air. However, if the heat pump heat exchanger is placed behind other vehicle heat exchangers, the heat pump heat exchanger may reject less heat to air flowing in the air flow path since other vehicle heat exchangers may increase the temperature of air flowing across the heat pump heat exchanger. Consequently, the heat pump may not operate with as high as an efficiency as is desired.

The inventor herein has recognized the above-mentioned disadvantages and has developed a method for operating a vehicle climate control system, comprising: transferring thermal energy from a heat pump to a high temperature coolant loop in a first climate control mode; and transferring thermal energy from the heat pump to a low temperature coolant loop in a second climate control mode.

By transferring thermal energy to a high temperature coolant loop in a first climate control mode and transferring thermal energy to a low temperature coolant loop in a second climate control mode, it may be possible to provide the technical result of improving heat pump efficiency since thermal energy may be transferred to two different heat exchangers. In particular, during a passenger cabin heating mode, thermal energy extracted from ambient air via an external heat exchanger may be directed to a high temperature coolant loop where the thermal energy may be transferred to the passenger cabin. On the other hand, during a passenger cabin cooling mode, thermal energy from the passenger cabin may be transferred to a low temperature coolant loop and a low temperature radiator. Thus, two heat pump operating modes may utilize different heat exchangers having different packaging locations that may improve the heat pump's efficiency. For example, the low temperature radiator may be positioned in front of other engine heat exchangers so that it may reject more heat to ambient air during a passenger cabin cooling mode. The external heat exchanger may be positioned behind other vehicle heat exchangers so as to improve the heat pump's efficiency during a passenger cabin heating mode.

The present description may provide several advantages. In particular, the approach may allow heat pump heat exchangers to be positioned such that heat pump efficiency may be improved. Further, the approach may allow the vehicle's climate control system to operate as desired using less refrigerant. Additionally, it may be possible to reduce the size of the heat pump's external heat exchanger.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
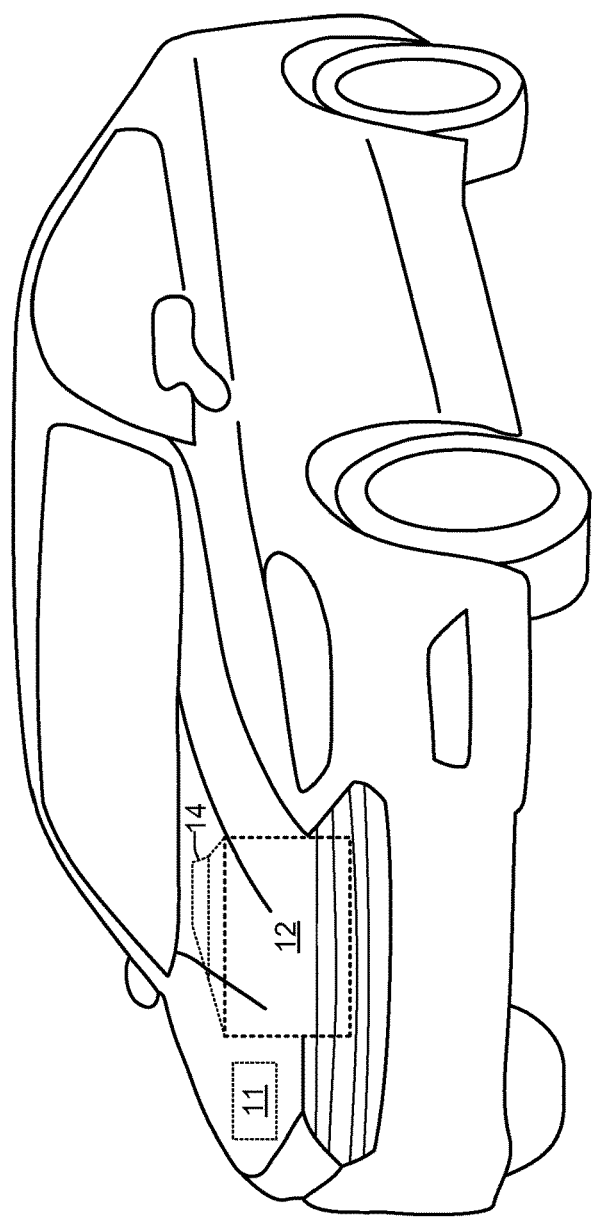
FIG. 1 is a schematic diagram of a vehicle.
Figure 2:
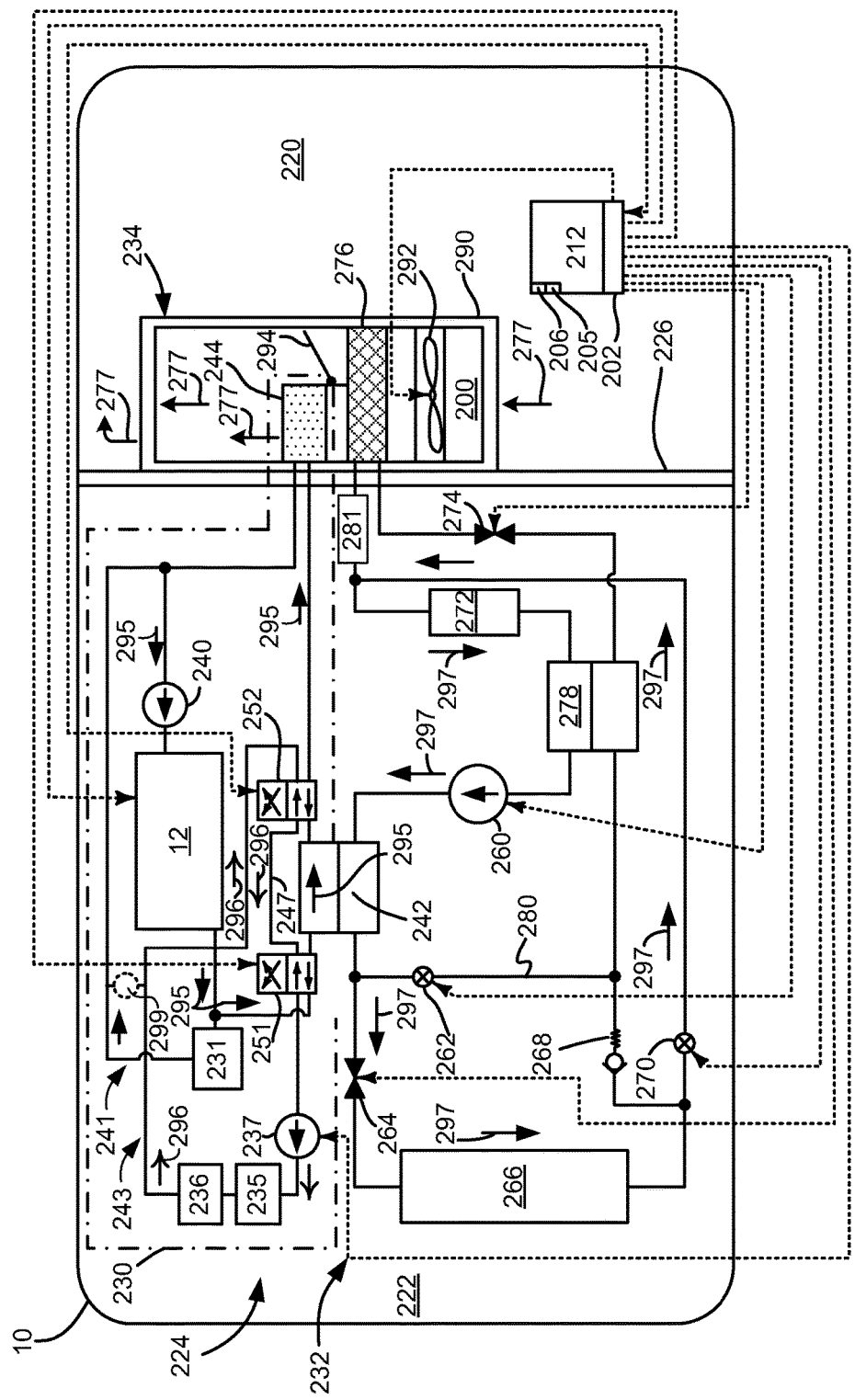
FIG. 2 shows an example vehicle climate control system operating in a heating mode.
Figure 3:
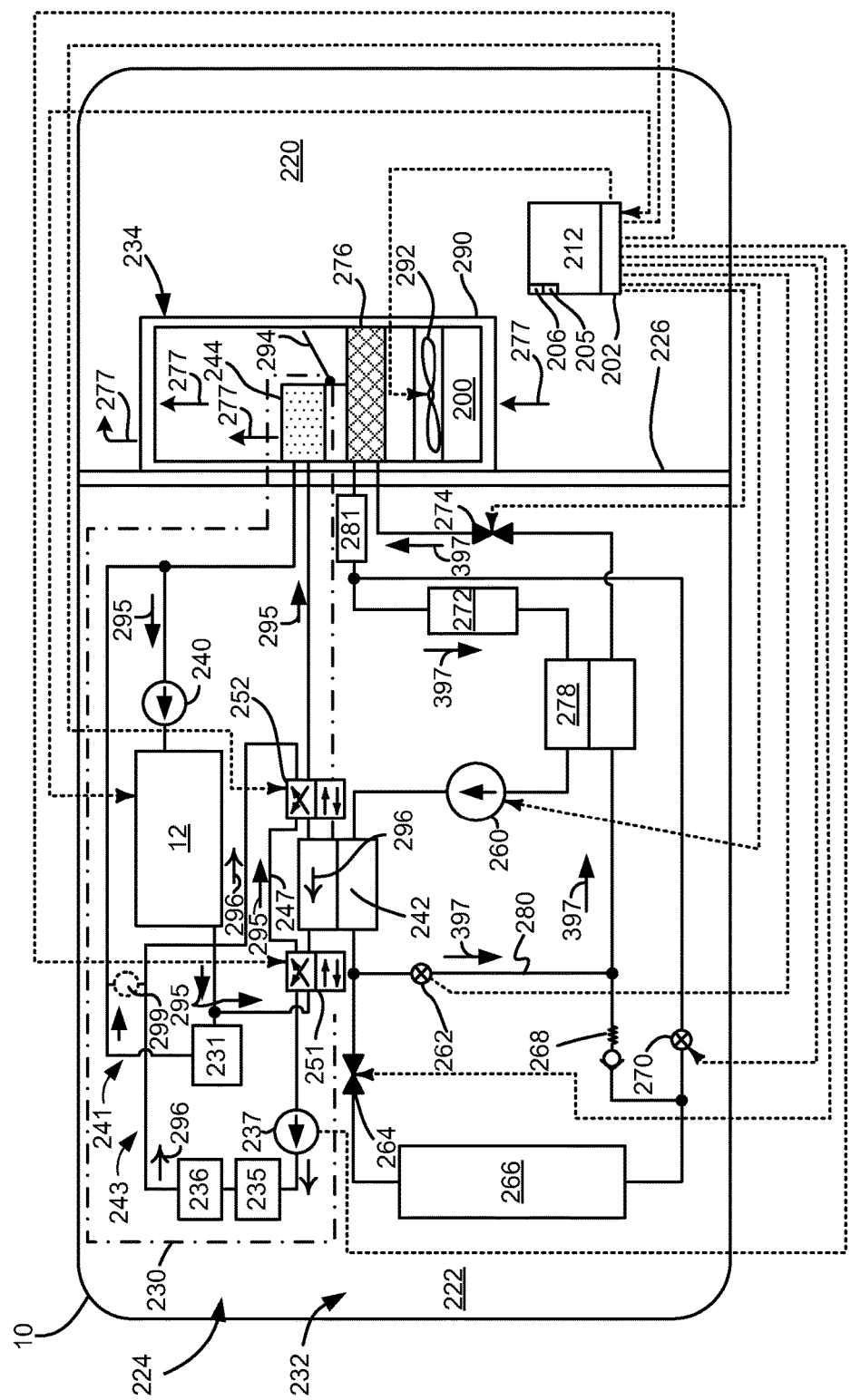
FIG. 3 shows an example vehicle climate control system operating in a cooling mode.
Figure 4:
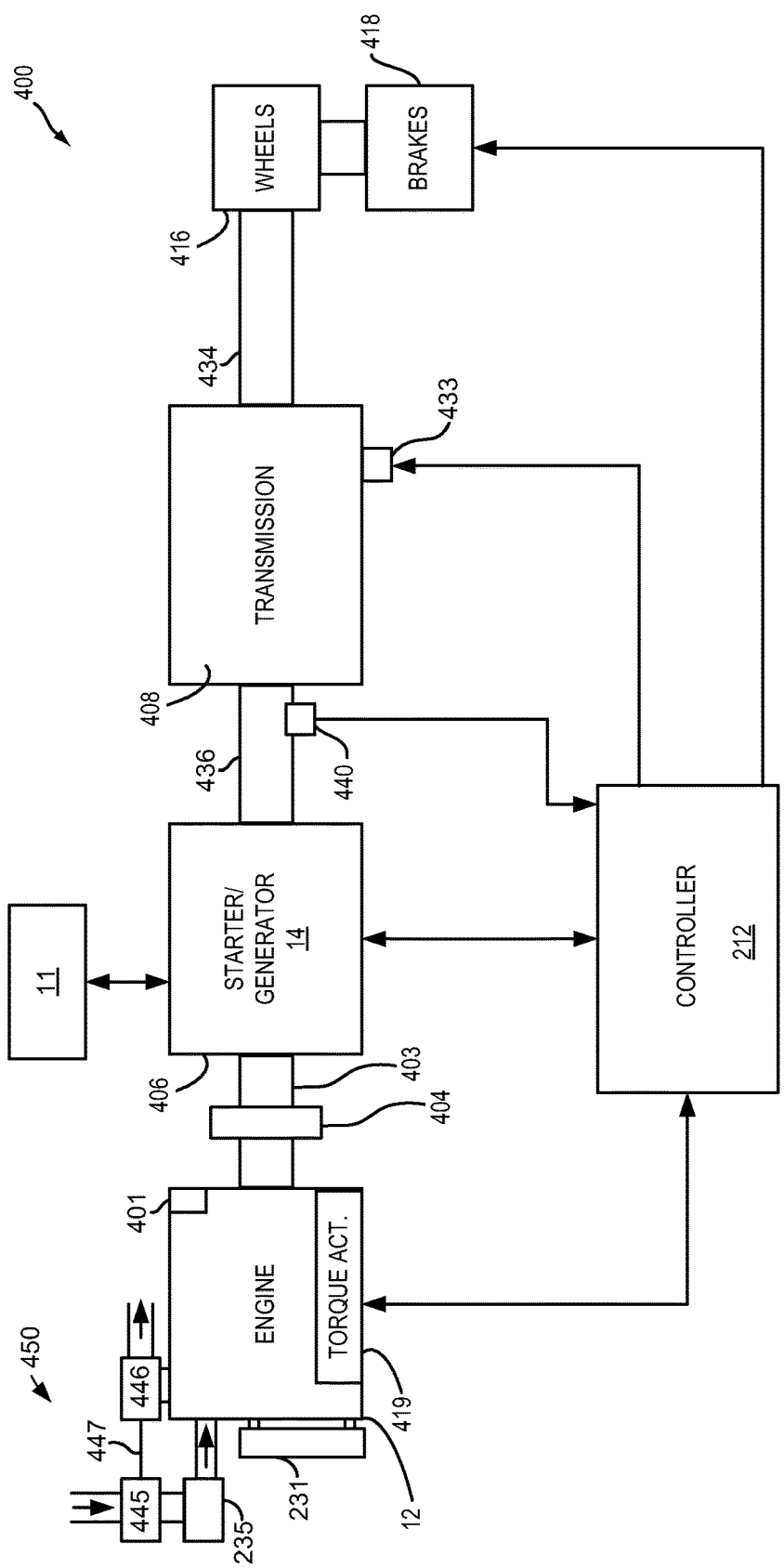
FIG. 4 shows an example vehicle driveline for the vehicle of FIG. 1.

The present description is related to providing climate control for a vehicle passenger cabin. Specifically, a method and system for providing heating and cooling to a vehicle's cabin via a heat pump including two heat exchangers that are external to the vehicle's cabin is described. The vehicle may be a passenger vehicle as is shown in FIG. 1 or a commercial vehicle (not shown). The heat pump may be configured and operate as shown in FIGS. 2 and 3. The vehicle may include an engine in a powertrain as shown in FIG. 4. Finally, the heat pump may be operated according to the method of FIG. 5.

Referring to FIG. 1, a vehicle 10 including an engine 12, an electrical machine 14, and an electrical energy storage device 11 is shown. In one example, the vehicle may be propelled solely via the engine 12, solely via an electrical machine 14, or by both the engine 12 and the electrical machine 14. The electrical machine 14 may be supplied electrical power via the electrical energy storage device 11. The electrical energy storage device 11 may be recharged via the vehicle's kinetic energy or via engine 12 providing power to electrical machine 14. The electric machine 14 may convert the vehicle's kinetic energy or engine torque into electrical energy which is stored in electric energy storage device 11. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device.

The vehicle 10 may include a driveline as shown in FIG. 4 or another suitable driveline to propel the vehicle 10 and/or power vehicle components. Vehicle 10 is shown with internal combustion engine 12, and it may be selectively coupled to an electric machine 14. Internal combustion engine 12 may combust petrol, diesel, alcohol, hydrogen, or a combination of fuels.

Referring now to FIG. 2, a vehicle climate control system 224 is shown in a passenger cabin heating mode. Devices and fluidic passages or conduits are shown as solid lines. Electrical connections are shown as dashed lines. The vehicle climate control system 224 may be included in vehicle 10 shown in FIG. 1, and the vehicle climate control system 224 may operate according to the method of FIG. 5.

The vehicle 10 may include a passenger compartment 220, an engine compartment 222, and a climate control system 224. The passenger compartment 220 may be within vehicle 10 and it may receive one or more occupants. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and a ventilation subsystem 234.

Coolant subsystem 230 includes a high temperature coolant loop 241 and a low temperature coolant loop 243. High temperature coolant loop 241 includes internal combustion engine 12, engine radiator 231, pump 240, and heater core 244. The low temperature coolant loop 243 includes pump 237, low temperature radiator 236, and optional liquid cooled charge air cooler 235. The low temperature coolant loop 243 and the high temperature coolant loop 241 may be in communication with de-gas bottle 299. Alternatively, coolant in high temperature coolant loop 231 may be isolated from coolant in low temperature coolant loop 243. Coolant such as water or glycol may flow through both high temperature coolant loop 241 and low temperature coolant loop 243. Coolant from high temperature coolant loop 241 and low temperature coolant loop 243 may pass through intermediate refrigerant to engine coolant heat exchanger 242 via control valves 251 and 252.

In one example, control valves 251 and 252 may be four-port, two-position valves. Coolant in high temperature coolant loop passes through intermediate refrigerant to engine coolant heat exchanger 242 when control valves 251 and 252 are in respective first positions (e.g., positioned for passenger cabin heating mode). Coolant in low temperature coolant loop 243 passes through intermediate refrigerant to engine coolant heat exchanger 242 when control valves 251 and 252 are in respective second positions (e.g., passenger cabin cooling mode). Thus, control valves 251 and 252 provide the capability to transfer heat from heat pump subsystem 232 to passenger cabin 220 or ambient air via low temperature radiator 236.

Control valves 251 and 252 are shown in first positions where coolant in high temperature coolant loop 241 passes through intermediate refrigerant to engine coolant heat exchanger 242 in the direction shown by arrows 295 during passenger cabin heating mode, de-icing mode, parallel dehumidification mode, and serial dehumidification mode. Coolant in the low temperature coolant loop 243 passes through bypass passage 247 when valves 251 and 252 are in the first positions in the direction shown by arrows 296.

Waste heat generated by internal combustion engine 12 when the engine is running or combusting air and fuel may be transferred to the coolant. The coolant may be circulated through engine radiator 231 to cool internal combustion engine 12 and heater core 244 to heat passenger cabin 220 as indicated by arrows 295. Heat may also be transferred from heat pump subsystem 232 to coolant in the high temperature coolant loop 241 via intermediate refrigerant to engine coolant heat exchanger 242 when climate control system 224 is in a passenger cabin heating mode. Heat pump subsystem 232 transfers heat from passenger cabin 220 via intermediate refrigerant to engine coolant heat exchanger 242 to low temperature coolant loop 243 when climate control system 224 is in a passenger cabin cooling mode described in FIG. 3.

The coolant pump 240 may circulate coolant through the high temperature coolant loop 241 of coolant subsystem 230. Likewise, pump 237 may circulate coolant through the low temperature coolant loop 243 of coolant subsystem 230. The coolant pumps 240 and 237 may be powered by an electrical or non-electrical power source. For example, the coolant pump 240 may be operatively coupled to an internal combustion engine 12 via a belt, or alternatively may be driven by an electrically powered motor.

Coolant pump 240 may supply coolant to the internal combustion engine 12 and circulate the coolant in a closed loop. For example, when the climate control system 224 is in a heating mode, coolant may be routed from the coolant pump 240 to engine 12. Coolant output from the engine may be directed to radiator and/or intermediate refrigerant to engine coolant heat exchanger 242. Coolant supplied to radiator 231 is returned to pump 240. Coolant supplied to intermediate refrigerant to engine coolant heat exchanger 242 is directed to heater core 244 before being returned to pump 240. Control valves 251 may be electrically operated to selectively direct coolant from engine 12 through intermediate refrigerant to engine coolant heat exchanger 242 or around intermediate refrigerant to engine coolant heat exchanger 242 via bypass passage 247.

The intermediate refrigerant to engine coolant heat exchanger 242 may facilitate the transfer of thermal energy between the coolant subsystem 230 and the heat pump subsystem 232. In particular, heat may be transferred from heat pump subsystem 232 to coolant subsystem 230 for heating passenger cabin 220 via heater core 244 or to be rejected to atmosphere via low temperature radiator 236. The intermediate refrigerant to engine coolant heat exchanger 242 may be part of the coolant subsystem 230 and the heat pump subsystem 232. The intermediate refrigerant to engine coolant heat exchanger 242 may have any suitable configuration. For example, the intermediate refrigerant to engine coolant heat exchanger 242 may have a plate-fin, tube-fin, or tube-and-shell configuration that may facilitate the transfer of thermal energy from heat pump subsystem 232 to coolant subsystem 230 without mixing or exchanging the heat transfer fluids in the coolant subsystem 230 and heat pump subsystems 232.

Heat may be transferred from the heat pump subsystem 232 to the coolant via the intermediate refrigerant to engine coolant heat exchanger 242 when the climate control system 224 is in a heating mode or a cooling mode. During a passenger cabin cooling mode, intermediate refrigerant to engine coolant heat exchanger 242 transfers heat from heat pump subsystem 232 to the low temperature coolant loop 243. During a passenger cabin heating mode, intermediate refrigerant to engine coolant heat exchanger 242 transfers heat from heat pump subsystem 232 to high temperature coolant loop 241 to heat passenger cabin 220 via heater core 244.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The heat pump subsystem 232 may transfer thermal energy to or from the passenger compartment 220 and to or from the coolant subsystem 230. In at least one example, the heat pump subsystem 232 may be configured as a vapor compression heat pump subsystem 232 in which a fluid is circulated through the vapor compression heat pump subsystem 232 to transfer thermal energy to or from the passenger compartment 220. The heat pump subsystem 232 may operate in various modes, including, but not limited to a cooling mode and a heating mode. In the cooling mode, the heat pump subsystem 232 may circulate a heat transfer fluid, which may be called a refrigerant, to transfer thermal energy from inside the passenger compartment 220 to outside the passenger compartment 220. In a heating mode, the heat pump subsystem 232 may transfer thermal energy from the refrigerant in the heat pump subsystem 232 to the coolant in the coolant subsystem 224 via the intermediate refrigerant to engine coolant heat exchanger 242 without circulating the refrigerant through a heat exchanger in the passenger compartment 220.

Heat pump subsystem 232 may include a pump 260, a first control valve 262, a first expansion device 264, an exterior heat exchanger 266 (e.g., a heat exchanger exterior relative to passenger cabin 220), a check valve 268, a third control valve 270, a pressure regulator 281, an accumulator 272, a second expansion device 274, an interior heat exchanger 276, a exterior heat exchanger bypass passage 280, and an optional internal heat exchanger 278. Components of the heat pump subsystem 232 may be in fluidic communication via one or more conduits, such as a tube, hose or the like. In FIG. 2, the refrigerant circulation path when in the heating mode is represented by the arrowed lines 297.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor.

In a passenger cabin heating mode, the pump 260 may provide high pressure refrigerant to the intermediate refrigerant to coolant heat exchanger 242, which in turn may transfer heat from the high pressure refrigerant to coolant passing through the intermediate refrigerant to coolant heat exchanger 242 to heat coolant flowing in coolant subsystem 230.

The first control valve 262 is shown positioned along a bypass path 280, which is positioned between the intermediate heat exchanger 242 and the first expansion device 264. The bypass path 280 may permit flowing refrigerant to bypass the first expansion device 264 and the exterior heat exchanger 266 and flow to the internal heat exchanger 278 (if provided), the second expansion device 274, and the interior heat exchanger 276 when the first control valve 262 is open during a passenger cabin cooling mode described in greater detail in the description of FIG. 3. The first control valve 262 may be closed to inhibit the flow of refrigerant through the bypass path 280 to the interior heat exchanger 276 when the heat pump subsystem 232 is in the passenger cabin heating mode.

The first expansion device 264 is shown positioned between and may be in fluidic communication with intermediate refrigerant to coolant heat exchanger 242 and the exterior heat exchanger 266. The first expansion device 264 may be provided to change the pressure of the refrigerant. For example, the first expansion device 264 may be a thermal expansion valve (TXV) or a fixed or variable position valve (e.g., an electrically controlled expansion valve) that may or may not be externally controlled. The first expansion device 264 may reduce the pressure of the refrigerant that passes through the first expansion device 264 from the intermediate heat exchanger 242 to the exterior heat exchanger 266. Therefore, high pressure refrigerant received from the intermediate heat exchanger 242 may exit the first expansion device 264 at a lower pressure and as a liquid and vapor mixture in the passenger cabin heating mode.

The exterior heat exchanger 266 may be positioned outside the passenger compartment 220. In a heating mode, the exterior heat exchanger 266 may operate as an evaporator and may transfer heat from the ambient surrounding environment to the refrigerant, thereby causing the refrigerant to vaporize.

The check valve 268 may be positioned between the exterior heat exchanger 266 and the bypass path 280. The check valve 268 may inhibit the flow of refrigerant from the bypass path 280 to the exterior heat exchanger 266. As such, refrigerant exiting the exterior heat exchanger 266 when the climate control system 224 is in the passenger cabin heating mode may be routed to the second control valve 270.

A second control valve 270 may be positioned between the exterior heat exchanger 266 and the accumulator 272. The second control valve 270 may help control the flow of refrigerant that exits the exterior heat exchanger 266. In the passenger cabin heating mode, the second control valve 270 may be open to permit refrigerant to flow from the exterior heat exchanger 266 to the accumulator 272.

The accumulator 272 may act as a reservoir for storing any residual liquid refrigerant so that vapor refrigerant, rather than liquid refrigerant, may be provided to the pump 260. The accumulator 272 may include a desiccant that absorbs small amounts of water moisture from the refrigerant.

The second expansion device 274 may be positioned between and may be in fluidic communication to the exterior heat exchanger 266 and the interior heat exchanger 276. The second expansion device 274 may have a similar structure as the first expansion device 264 and may be provided to change the pressure of the refrigerant similar to the first expansion device 264. In addition, the second expansion device 274 may be closed to inhibit the flow of refrigerant. More specifically, the second expansion device 274 may be closed to inhibit the flow of refrigerant from the exterior heat exchanger 266 to the interior heat exchanger 276 in the passenger cabin heating mode. As such, closing the second expansion device 274 may inhibit the flow of refrigerant through check valve 268 to the internal heat exchanger 278 (if provided), as well as through the interior heat exchanger 276.

The interior heat exchanger 276 may be in fluidic communication with the second expansion device 274. The interior heat exchanger 276 may be positioned inside the passenger compartment 220. In the passenger cabin heating mode, refrigerant may not be routed to the interior heat exchanger 276 due to the closure of the second expansion device 274.

The internal heat exchanger 278, if provided, may transfer thermal energy between refrigerant flowing through different regions of the heat pump subsystem 232. The internal heat exchanger 278 may be positioned outside the passenger compartment 220. In the passenger cabin heating mode, the internal heat exchanger 278 does not transfer thermal energy between such refrigerant flow paths since the second expansion device 274 is closed, thereby inhibiting the flow of refrigerant through a portion of the internal heat exchanger 278.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air from inside the passenger compartment 220 and recirculate such air through the ventilation subsystem 234. One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Controller 212 includes executable instructions of the method in FIG. 4 to operate the valves, fans, and pumps or compressors of the system shown in FIG. 2. Controller 212 includes inputs and outputs 202 to interface with devices in the system of FIG. 2. Controller 212 also includes a central processing unit 205 and non-transitory memory 206 for executing the method of FIG. 5.

The system of FIG. 2 may also be operated in a de-ice mode. During de-ice mode first expansion device 264 may be adjusted (e.g., fully opened) so that a small pressure drop (e.g., less than 15 kPa pressure drop) occurs across first expansion device 264. Further, second expansion device 274 is closed so that refrigerant does not pass through interior heat exchanger 276. Compressor 260 increases temperature of refrigerant as it compresses the refrigerant. The heated refrigerant is directed through exterior heat exchanger 266, thereby warming exterior heat exchanger 266 to de-ice coils. The heated refrigerant is returned to compressor 260 after the refrigerant flows through accumulator 272 and internal heat exchanger 278.

The system of FIG. 2 may also be operated in a series passenger cabin dehumidification mode. During series passenger cabin dehumidification mode, first expansion device 264 is opened to allow refrigerant to flow to external heat exchanger 266, which acts as an evaporator, and first control valve 262 is closed to prevent refrigerant from flowing from intermediate refrigerant and to coolant heat exchanger 242 to interior heat exchanger 278. The compressed refrigerant passes through external heat exchanger 266 and check valve 268 before reaching second expansion device 274. Second expansion device 274 is adjusted to provide a small pressure drop, thereby limiting the cooling of interior heat exchanger 276. By providing only a small pressure drop across second expansion device 274, moisture in passenger cabin 220 may be condensed without substantially cooling the cabin air. Refrigerant leaves second expansion device 274 to enter interior heat exchanger 276. The refrigerant is returned to compressor 260 from heat exchanger 276 after it passes through pressure regulator 280 and accumulator 272.

The system of FIG. 2 may also be operated in a parallel passenger cabin dehumidification mode. During parallel passenger cabin dehumidification mode, first control valve 262, and second control valve 270 are opened to allow refrigerant to flow through external heat exchanger 266 and bypass 280. Further, the first expansion device 264 is open and it regulates refrigerant flow into the external heat exchanger 266. Refrigerant output from external heat exchanger 266 is directed to accumulator 272. Refrigerant passing through bypass passage 280 is directed through second expansion device 274 and interior heat exchanger 276. Operating the heat pump subsystem 232 in a parallel dehumidification mode allows cabin dehumidification at lower ambient air temperatures. The refrigerant pressure in the external heat exchanger 266 is allowed to drop without causing very low refrigerant pressures in the interior heat exchanger 276, thereby decreasing the risk of ice forming on the coils of internal heat exchanger 276.

Referring now to FIG. 3, a vehicle climate control system 24 is shown in a passenger cabin cooling mode. Devices and fluidic passages or conduits are shown as solid lines. Electrical connections are shown as dashed lines. The vehicle climate control system 24 may be included in vehicle 10 shown in FIG. 1, and the vehicle climate control system 24 may operate according to the method of FIG. 5. Additionally, the elements shown in FIG. 3 that have the same numbering as the elements in FIG. 2 are the same elements described in FIG. 2. The elements shown in FIG. 3 operate as described in FIG. 2 except where as indicated otherwise in the description of FIG. 3. Therefore, for the sake of brevity, a description of each element in FIG. 3 that is the same as a corresponding element in FIG. 2 is omitted.

FIG. 3 shows control valves 251 and 252 in a second state where the heat pump subsystem is in a passenger cabin cooling mode. Coolant in the low temperature coolant loop 243 passes through intermediate refrigerant to engine coolant heat exchanger 242 during passenger cabin cooling mode. Coolant flows in the low temperature coolant loop in the direction shown by arrows 296. Coolant flows in high temperature coolant loop in the direction shown by arrows 295. Heat transferred from the heat pump subsystem to the low temperature coolant loop 243 is rejected to atmosphere via low temperature radiator 236 along with heat from intake air that is transferred to coolant by liquid cooled charge air cooler 235.

The heat pump subsystem 232 enters a passenger cabin cooling mode by closing second control valve 270, activating pump 260, and opening first control valve 262. Expansion valve 274 may also be adjusted to provide a desired refrigerant pressure drop. The refrigerant circulation path is represented by the arrowed lines 397 when heat pump subsystem 232 is in the passenger cabin cooling mode. Refrigerant does not flow through exterior heat exchanger 266 during the passenger cabin cooling mode. Instead, intermediate heat exchanger 242 operates as a condenser and it transfers heat from passenger cabin 220 to the low temperature coolant loop 243. Coolant in the high temperature coolant loop 241 does not pass through intermediate heat exchanger 242 during the passenger cabin cooling mode. Rather, coolant from the high temperature coolant loop passes through bypass passage 247 so that heat from the passenger cabin is transferred to the low temperature coolant loop 243.

Referring now to FIG. 4, a block diagram of a vehicle driveline 400 in vehicle 10 is shown. Driveline 400 may be powered by engine 12. Engine 12 may be started with an engine starting system including starter 401 or via electric machine or driveline integrated starter generator (DISG) 14. Further, engine 12 may generate or adjust torque via torque actuator 419, such as a fuel injector, throttle, camshaft, etc.

Engine 12 includes a radiator 231 for dissipating engine waste heat and a turbocharger 450 including a compressor 445 and a turbine 446. Turbine 446 is driven by engine exhaust gases and it rotates compressor 445 via shaft 447. Air exiting compressor 445 may be cooled via liquid cooled charge air cooler 235. An engine output torque may be transmitted to driveline disconnect clutch 404. Driveline disconnect clutch 404 may be electrically or hydraulically actuated. The downstream side of driveline disconnect clutch 404 is shown mechanically coupled to DISG input shaft 403.

DISG 14 may be operated to provide torque to driveline 400 or to convert driveline torque into electrical energy to be stored in electric energy storage device 11. DISG 14 has a power output that is greater than starter 401. Further, DISG 14 directly drives driveline 400 or is directly driven by driveline 400. There are no belts, gears, or chains to couple DISG 14 to driveline 400. Rather, DISG 14 rotates at the same rate as driveline 400. Electrical energy storage device 11 may be a battery, capacitor, or inductor. The downstream side of DISG 14 is mechanically coupled to transmission 408.

Automatic transmission 408 includes gear clutches (e.g., gears 1-6) for adjusting a transmission gear ratio. The gear clutches 433 may be selectively engaged to propel vehicle 10. Torque output from the automatic transmission 408 may in turn be relayed to wheels 416 to propel the vehicle via output shaft 434. Output shaft 434 delivers torque from transmission 408 to wheels 416. Automatic transmission 408 may transfer an input driving torque to the wheels 416.

Further, a frictional force may be applied to wheels 416 by engaging wheel friction brakes 418. In one example, wheel friction brakes 418 may be engaged in response to the driver pressing his foot on a brake pedal (not shown). In other examples, controller 412 or a controller linked to controller 212 may engage wheel friction brakes. In the same way, a frictional force may be reduced to wheels 416 by disengaging wheel friction brakes 418 in response to the driver releasing his foot from a brake pedal. Further, vehicle brakes may apply a frictional force to wheels 416 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG by adjusting current flowing to and from DISG windings as is known in the art.

When idle-stop conditions are satisfied, controller 212 may initiate engine shutdown by shutting off fuel and spark to the engine. However, the engine may continue to rotate in some examples. Conversely, when restart conditions are satisfied, and/or a vehicle operator wants to launch the vehicle, controller 212 may reactivate the engine by resuming combustion in cylinders. The engine may be started via rotating the engine via DISG 14 or starter 401.

Thus, the system of FIGS. 1-4 provides for a vehicle system, comprising: a high temperature coolant loop; a low temperature coolant loop; a refrigerant to coolant heat exchanger; a heat pump including refrigerant; and two control valves adjustable to allow coolant flow from the high temperature coolant loop to the refrigerant to coolant heat exchanger, and the two control valves adjustable to allow coolant flow from the low temperature coolant loop to the refrigerant to coolant heat exchanger. The vehicle system includes where the two control valves do not allow coolant flow from the high temperature coolant loop to the refrigerant to coolant heat exchanger while allowing coolant flow from the low temperature coolant loop to the refrigerant to coolant heat exchanger. The vehicle system includes where the high temperature coolant loop includes an engine, a radiator, coolant, and a heater core. The vehicle system includes where the low temperature coolant loop includes a low temperature radiator and coolant. The vehicle system further comprises a controller including instructions stored in non-transitory memory for adjusting the two control valves. The vehicle system further comprises additional instructions stored in non-transitory memory for operating the heat pump in a passenger cabin heating mode.

Figure 5:
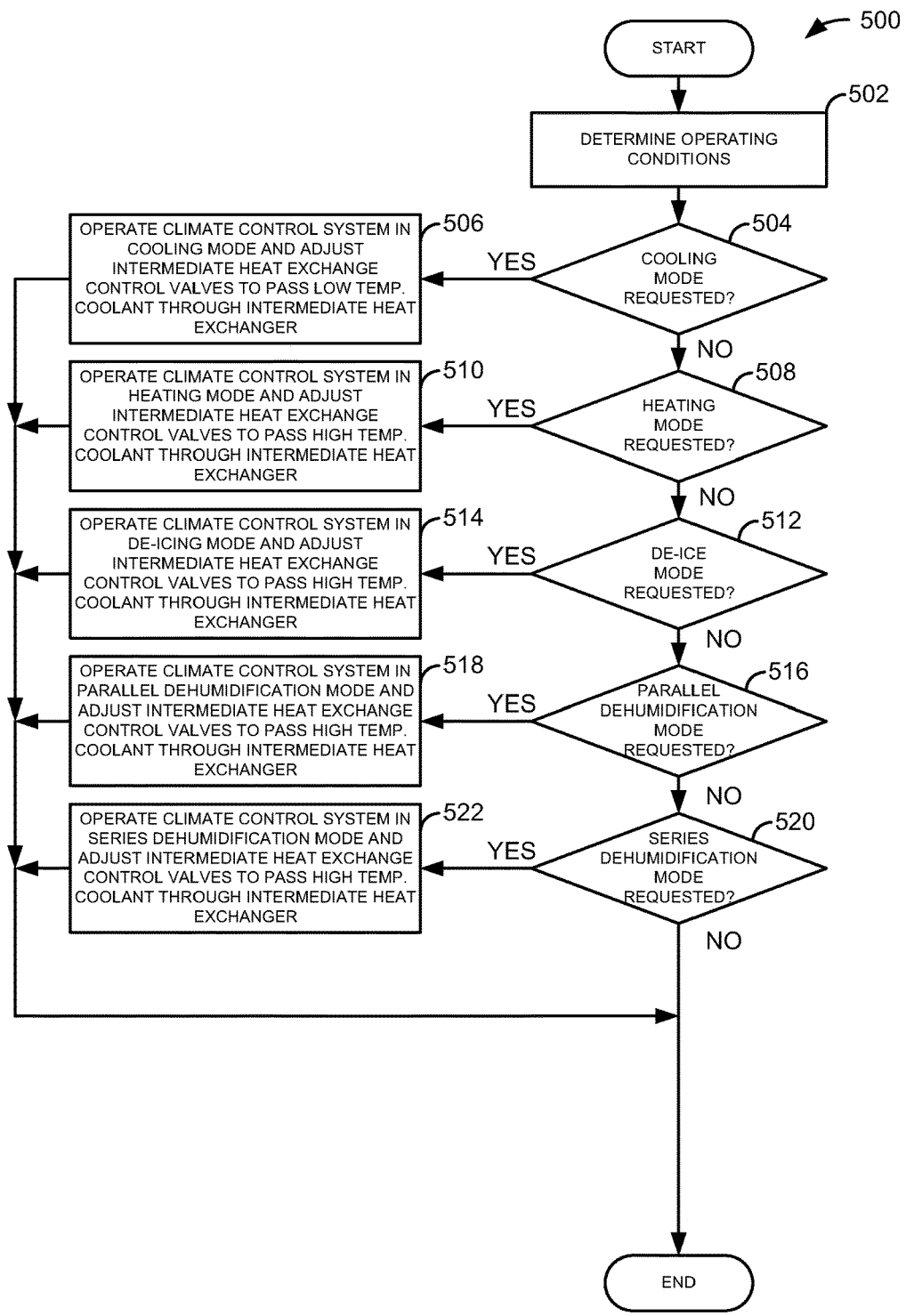
FIG. 5 shows a method for operating a vehicle climate control system.

Referring now to FIG. 5, a flowchart of a method for operating a vehicle climate control system is shown. The method of FIG. 5 may be included in the system of FIGS. 1-4 as executable instructions stored in non-transitory memory.

At 502, method 500 determines operating conditions. Operating conditions may include but are not limited to passenger cabin temperature and humidity, driver cabin temperature request, driver climate mode request, climate control mode request, ambient temperature and humidity, and engine operating status. Method 500 proceeds to 504 after operating conditions are determined.

At 504, method 500 judges whether or not passenger cabin cooling mode is requested. In one example, passenger cabin cooling mode may be requested by a driver. In other examples, passenger cooling mode may be requested by a climate control system. If method 500 judges that passenger cabin cooling mode is requested, the answer is yes and method 500 proceeds to 506. Otherwise, the answer is no and method 500 proceeds to 508.

At 506, method 500 operates the climate control system 224 in a passenger cabin cooling mode as explained in the description of FIG. 3. Further, heat from the passenger compartment is transferred to the low temperature coolant loop 243 via positioning control valves 251 and 252 in positions (e.g., a second position) where coolant in the low temperature coolant loop 243 passes through intermediate refrigerant to coolant heat exchanger 242. Coolant in high temperature coolant loop 241 bypasses intermediate refrigerant to coolant heat exchanger 242. Intermediate refrigerant to coolant heat exchanger 242 operates as a condenser, and interior heat exchanger 276 operates as an evaporator. Method 500 proceeds to exit after climate control system 224 enters passenger cabin cooling mode.

At 508, method 500 judges whether or not passenger cabin heating mode is requested. In one example, passenger cabin heating mode may be requested by a driver. In other examples, passenger heating mode may be requested by a climate control system. If method 500 judges that passenger cabin heating mode is requested, the answer is yes and method 500 proceeds to 510. Otherwise, the answer is no and method 500 proceeds to 512.

At 510, method 500 operates the climate control system 224 in a passenger cabin heating mode as explained in the description of FIG. 2. Further, heat from ambient air is transferred to the passenger cabin via the high temperature coolant loop 241 by positioning control valves 251 and 252 in positions (e.g., a first position) where coolant in the high temperature coolant loop 241 passes through intermediate refrigerant to coolant heat exchanger 242. Consequently, thermal energy is transferred from the refrigerant in heat pump subsystem 232 to coolant in the high temperature coolant loop. Coolant in low temperature coolant loop 243 bypasses intermediate refrigerant to coolant heat exchanger 242. Heat is supplied to passenger cabin 220 via heater core 244. Method 500 proceeds to exit after climate control system 224 enters passenger cabin heating mode.

At 512, method 500 judges whether or not de-icing mode is requested. In one example, de-icing may be requested by a climate control system. If method 500 judges that de-icing mode is requested, the answer is yes and method 500 proceeds to 514. Otherwise, the answer is no and method 500 proceeds to 516.

At 514, method 500 operates the climate control system 224 in de-icing mode as explained in the description of FIG. 2. Further, control valves 251 and 252 are positioned (e.g., a first position) such that coolant in the high temperature coolant loop 241 passes through intermediate refrigerant to coolant heat exchanger 242. Coolant in low temperature coolant loop 243 bypasses intermediate refrigerant to coolant heat exchanger 242. External heat exchanger 266 is warmed by compressed refrigerant so as to be de-iced. Method 500 proceeds to exit after climate control system 224 enters de-icing mode.

At 516, method 500 judges whether or not parallel dehumidification mode is requested. In one example, parallel dehumidification mode may be requested by a climate control system. If method 500 judges that parallel dehumidification mode is requested, the answer is yes and method 500 proceeds to 518. Otherwise, the answer is no and method 500 proceeds to 520.

At 518, method 500 operates the climate control system 224 in parallel dehumidification mode as explained in the description of FIG. 2. Further, control valves 251 and 252 are positioned (e.g., a first position) such that coolant in the high temperature coolant loop 241 passes through intermediate refrigerant to coolant heat exchanger 242. Coolant in low temperature coolant loop 243 bypasses intermediate refrigerant to coolant heat exchanger 242. Internal heat exchanger 276 is cooled to remove humidity from passenger cabin 220. Method 500 proceeds to exit after climate control system 224 enters parallel dehumidification mode.

At 520, method 500 judges whether or not series dehumidification mode is requested. In one example, series dehumidification mode may be requested by a climate control system. If method 500 judges that series dehumidification mode is requested, the answer is yes and method 500 proceeds to 522. Otherwise, the answer is no and method 500 proceeds to exit.

At 522, method 500 operates the climate control system 224 in series dehumidification mode as explained in the description of FIG. 2. Further, control valves 251 and 252 are positioned (e.g., a first position) such that coolant in the high temperature coolant loop 241 passes through intermediate refrigerant to coolant heat exchanger 242. Coolant in low temperature coolant loop 243 bypasses intermediate refrigerant to coolant heat exchanger 242. Internal heat exchanger 276 is cooled to remove humidity from passenger cabin 220. Method 500 proceeds to exit after climate control system 224 enters series dehumidification mode.

Thus, the method of FIG. 5 provides for a method for operating a vehicle climate control system, comprising: transferring thermal energy from a heat pump to a high temperature coolant loop in a first climate control mode; and transferring thermal energy from the heat pump to a low temperature coolant loop in a second climate control mode. The method includes where the thermal energy is transferred from the heat pump to the high temperature coolant loop without transferring thermal energy to the low temperature coolant loop. The method also includes where the thermal energy is transferred from the heat pump to the low temperature coolant loop without transferring thermal energy to the high temperature coolant loop.

In some examples, the method includes where the thermal energy is transferred from the heat pump via a heat exchanger. The method includes where the first climate control mode is a passenger cabin heating mode. The method includes where the first climate control mode is a passenger cabin cooling mode. The method includes where the heat pump is a vapor compression heat pump.

The method of FIG. 5 also provides for a method for operating a vehicle climate control system, comprising: adjusting a position of two valves to direct coolant from a high temperature coolant loop through a refrigerant to coolant heat exchanger in a first mode; and adjusting the position of the two valves to direct coolant from a low temperature coolant loop through the refrigerant to coolant heat exchanger in a second mode. The method includes where coolant in the high temperature coolant loop is isolated from coolant in the low temperature coolant loop. The method also includes where coolant in the low temperature coolant loop bypasses the refrigerant to coolant heat exchanger in the first mode.

In some examples, the method includes where coolant in the high temperature coolant loop bypasses the refrigerant to coolant heat exchanger in the second mode. The method also includes where a heat pump is operated in a passenger cabin cooling mode in the second mode. The method also includes where a heat pump is operated in a passenger cabin heating mode in the first mode. The method includes where a heat pump is operated in a passenger cabin dehumidification mode in the first mode.

As will be appreciated by one of ordinary skill in the art, methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, vehicles including electric, hybrid, or internal combustion engine propulsion systems could use the present description to advantage.

The invention claimed is:

1. A method for operating a vehicle climate control system, comprising:
    transferring thermal energy from a heat pump to a high temperature coolant loop in a first climate control mode; and
    transferring thermal energy from the heat pump to a low temperature coolant loop in a passenger cabin cooling mode.

2. The method of claim 1, where the thermal energy is transferred from the heat pump to the high temperature coolant loop without transferring thermal energy to the low temperature coolant loop.

3. The method of claim 1, where the thermal energy is transferred from the heat pump to the low temperature coolant loop without transferring thermal energy to the high temperature coolant loop.

4. The method of claim 1, where the thermal energy is transferred from the heat pump via a heat exchanger.

5. The method of claim 1, where the first climate control mode is a passenger cabin heating mode.

6. The method of claim 1, where the heat pump is a vapor compression heat pump.

7. The method of claim 1, wherein, in the passenger cabin cooling mode, heat is transferred from a passenger cabin to the low temperature coolant loop and then rejected to ambient air via a low temperature radiator.

8. The method of claim 7, wherein heat is absorbed from the passenger cabin by refrigerant in an interior heat exchanger, then the heat of the refrigerant is transferred to a coolant in an intermediate heat exchanger, then the heat transferred to the coolant is rejected to ambient air via the low temperature radiator.

9. The method of claim 8, wherein the low temperature radiator is positioned to contact ambient air and a high temperature radiator is positioned to contact air warmed by engine components.

10. The method of claim 8, wherein a liquid cooled chair air cooler is connected to the low temperature coolant loop.

11. A vehicle system, comprising:
    a high temperature coolant loop;
    a low temperature coolant loop;
    a refrigerant to coolant heat exchanger;
    a heat pump including refrigerant;
    two control valves adjustable to allow coolant flow from the high temperature coolant loop to the refrigerant to coolant heat exchanger, and the two control valves adjustable to allow coolant flow from the low temperature coolant loop to the refrigerant to coolant heat exchanger; and
    in response to a passenger cabin cooling mode, the two control valves flow coolant from the low temperature coolant loop to the refrigerant to coolant heat exchanger and refrigerant evaporates in a passenger cabin heat exchanger.

12. The vehicle system of claim 11, where the two control valves do not allow coolant flow from the high temperature coolant loop to the refrigerant to coolant heat exchanger while allowing coolant flow from the low temperature coolant loop to the refrigerant to coolant heat exchanger.

13. The vehicle system of claim 11, where the high temperature coolant loop includes an engine, a radiator, a coolant, and a heater core.

14. The vehicle system of claim 13, where the low temperature coolant loop includes a low temperature radiator and a coolant.

15. The vehicle system of claim 11, further comprising a controller and instructions for adjusting the two control valves, the instructions stored in non-transitory memory.

16. The vehicle system of claim 15, further comprising additional instructions for operating the heat pump in a passenger cabin heating mode, the instructions stored in non-transitory memory.

17. The vehicle system of claim 11, wherein the low temperature coolant loop comprises a low temperature radiator positioned to contact ambient air and the high temperature coolant loop comprises a high temperature radiator positioned to contact air warmed by engine components.

18. The vehicle system of claim 17, wherein, in response to a passenger cabin cooling mode, refrigerant condenses in the refrigerant to coolant heat exchanger during the passenger cabin cooling mode, and heat is rejected to the ambient air via the low temperature radiator.

* * * * *